W. Z. MUSGRAVE.
STATION INDICATOR.
APPLICATION FILED MAY 24, 1915.
1,201,858.
Patented Oct. 17, 1916.
3 SHEETS—SHEET 2.
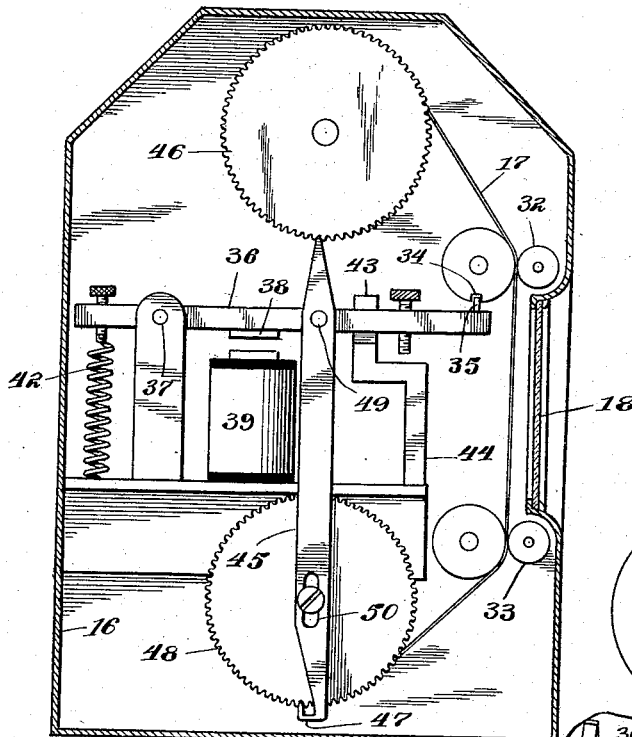
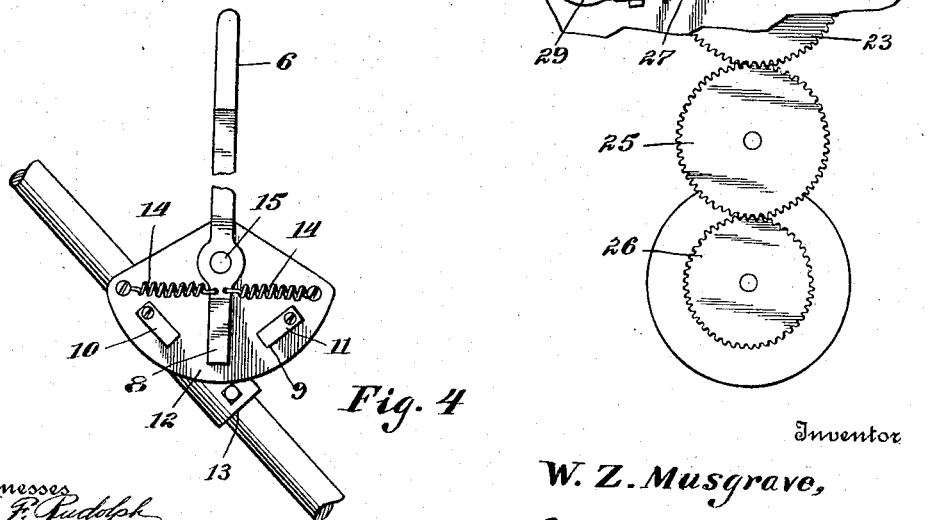
Witnesses
C. F. Rudolph
Wm. R. Smith
Inventor
W. Z. Musgrave,
By Victor J. Evans
Attorney W. Z. MUSGRAVE.
STATION INDICATOR.
APPLICATION FILED MAY 24, 1915.
1,201,858.
Patented Oct. 17, 1916.
3 SHEETS—SHEET 3.
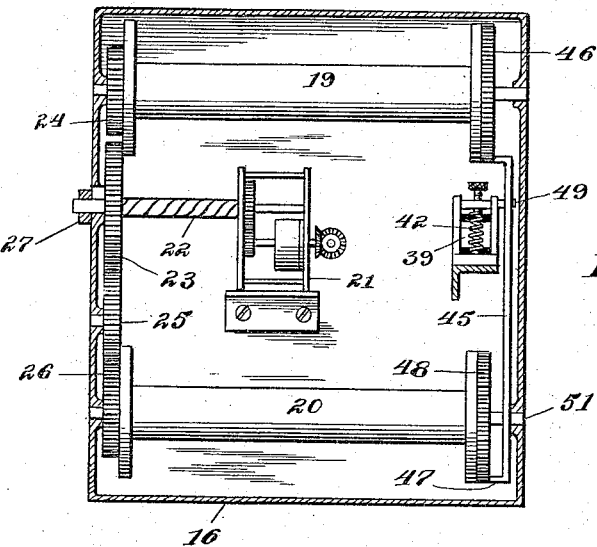
Fig. 6
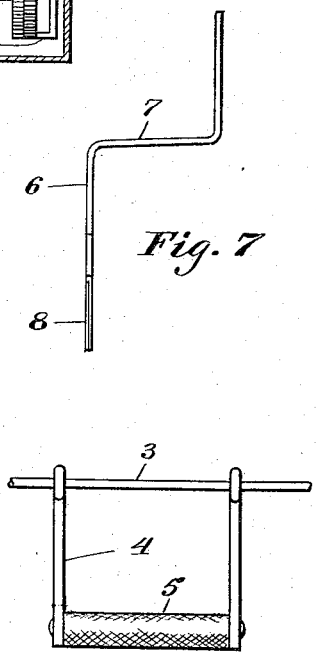
Fig. 7
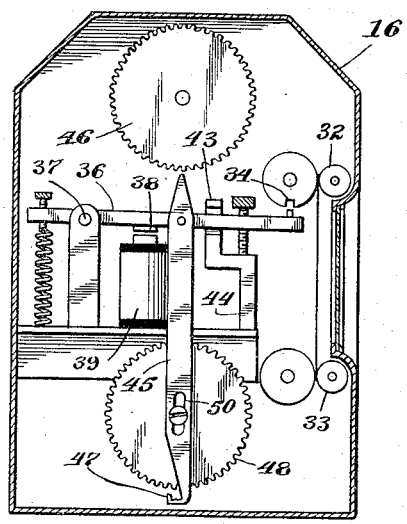
Fig. 9
Fig. 8
Witnesses
C. F. Rudolph
Wm R. Smith
Inventor
W. Z. Musgrave,
By Victor J. Evans
Attorney

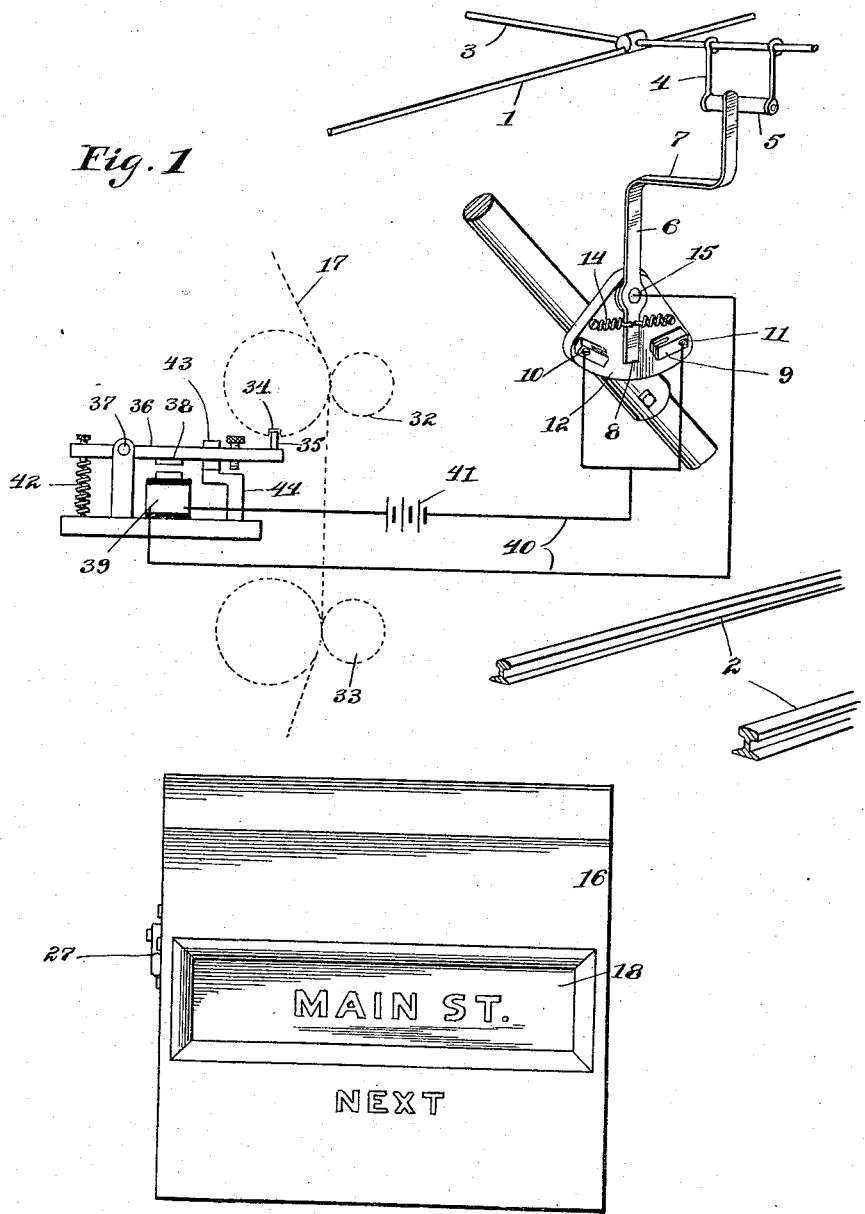

UNITED STATES PATENT OFFICE.

WILLIAM Z. MUSGRAVE, OF CHICAGO, ILLINOIS.

STATION-INDICATOR.

1,201,858.  Specification of Letters Patent.  Patented Oct. 17, 1916.

Application filed May 24, 1915. Serial No. 30,160.

*To all whom it may concern:*

Be it known that I, WILLIAM Z. MUSGRAVE, a citizen of the United States, residing at Chicago, in the county of Cook and State of Illinois, have invented new and useful Improvements in Station-Indicators, of which the following is a specification.

This invention relates to station indicators for vehicles of that type wherein the movable portion of the indicator proper comes in contact with a stationary obstacle positioned at spaced intervals along the direction of travel.

It has for its primary object the provision of an electro-mechanical indicator that has very few parts which are positive in their operation.

Another object of the invention is to simplify the circuit closing mechanism and at the same time arrange the mechanism so that the same will be operated in either direction of travel of the vehicle.

A further object of the invention is the provision of electro-responsive means whereby both of the rollers to which the apron is attached are simultaneously locked or released.

A still further object of the invention is the provision of electro-responsive means whereby two rollers to which the apron is attached and a feed roller are simultaneously locked or released so that the apron will not wrinkle at the sight opening of the cabinet.

The invention consists in the features of construction, combination, and arrangement of parts, hereinafter fully described and claimed, reference being had to the accompanying drawings, in which:

Figure 1 is a diagrammatic view of parts of the apparatus showing the electric circuit. Fig. 2 is a front elevation of a cabinet. Fig. 3 is a vertical section through the cabinet. Fig. 4 is an end elevation of the circuit closer. Fig. 6 is a vertical section. Figs. 5, 7, and 8, are detail views. Fig. 9 is a view similar to Fig. 3 showing the position of the parts when the apparatus is operated.

In this particular instance, I have shown an electrified railroad that utilizes an overhead trolley wire 1 as the current conveyer to the vehicle and the rails 2 as the return for the current. The trolley 1 is supported in any well known manner by the guide wires 3 depending from which is a U-shaped frame 4 having its extremity engaging the guide wire. Encircling the connecting portion of the U-shaped frame is a tube 5 of shock absorbing material, such as rubber. The just-mentioned obstacle is positioned to one side of the trolley wire so that the arm 6 of the circuit closing mechanism will not come into electrical contact with the trolley wire. As the circuit closing mechanism is secured to the trolley pole, the arm 6 is offset as indicated at 7.

The lowermost extremity of the arm 6 has secured thereto a copper contact 8, adapted in the arcuate movement of the arm to be forced between the limbs 9 of either of the contact strips 10 and 11, the contact 8 coöperating with the strip 10 when traveling in one direction and with the contact strip 11 when traveling in the opposite direction.

The contact strips 10 and 11 are secured to and insulated from a bracket 12, a portion of which encircles the trolley pole as indicated at 13.

For resiliently holding the arm 6 in a normal vertical position, I provide a pair of springs 14 having their extremities respectively connected to the arm 6 and the bracket 12, directly below the bearing 15 of the arm.

The mechanism within the cabinet 16 for intermittently passing the apron 17 before the sight opening 18 comprises a pair of vertically alined rollers 19 and 20 to which is secured the apron 17. For winding the apron upon one of the rollers and unwinding it from the other roller, I provide the clock mechanism 21, the main shaft 22 having secured thereto a master gear 23, the teeth of which are adapted to alternately engage the teeth of the gear 24 secured to the roller 19 or with the teeth of the idler 25 that in turn meshes with the teeth of the gear 26 secured to the roller 20. From this arrangement, it will be seen that by shifting the gear 21, the apron can be alternately fed in opposite directions.

For shifting the gear 23, I provide a lever 27 pivoted to the outer surface of the cabinet as indicated at 28 and provided with a handle 29 at its remaining extremity. The casing is provided with a slot 30 the walls of which coöperate with the shaft 22 that is connected to the lever 27.

Associated with the lever 29 is a clip for resiliently retaining the lever in any of its adjusted positions. The apron in passing from one roller to the other runs between two pairs of feed rollers 32 and 33. One of the feed rollers of the pair 32 is provided with a notch 34, the walls of which coöperate with a lug 35 formed on the lever 36 pivoted at 37. The lever 36 is provided with an armature 38 that is under the control of a pair of electromagnets 39 arranged in an electric circuit 40 in series with a battery 41. This circuit has its continuity normally broken at the contacts 8, 10 and 11.

Working in opposition to the electromagnet is a spring 42 that has one extremity secured to the lever and its other extremity secured to a stationary support. The movement of the lever through the action of the spring 42 is limited by the overhanging extremity 43 of a bracket 44. For simultaneously allowing the rollers 19 and 20 to rotate with the feed rollers, I provide a rod 45 having its upper extremity coöperating with the teeth of the gear 46 secured to the roller 19 and its lower extremity provided with an offset projection 47 that coöperates with the teeth of the gear 48 secured to the shaft 20. This lever is pivotally connected as indicated at 49 to the lever 36 while adjacent the projection 47 it is provided with a slot 50, the walls of which coöperate with the shaft 51 of the roller 20.

From the foregoing description, it will be seen that just before approaching a particular street, the arm 6 comes into contact with the teeth 5 of the obstacle with the result that the arm is given an arcuate movement for throwing the contact 8 into engagement with either of the contacts 10 or 11.

Immediately the contact 8 comes into contact with one of the contact strips, the electrical circuit is closed through the electromagnet. At this point, attention is called to the fact that by providing the contact strips with resilient limbs, a bright contact surface is always provided for assuring a good electrical connection. Upon energization of the magnets, the armature is retracted and with it the lever 36 which simultaneously allows the rollers 19 and 20, and the feed rollers provided with the notch 34, to rotate through the action of the spring motor heretofore mentioned. From this arrangement, it will be seen that the apron is prevented from unwinding from either of the rollers 19 and 20 and at the same time the apron is prevented from wrinkling at the sight opening which would take place if a portion of the apron was allowed to gravitate between the upper pair of feed rollers 32.

Having described my invention, what is claimed is:

1. In a station indicator for vehicles, a pair of toothed rollers, indicating means passing around said rollers, a feed roller coöperating with said indicating means and provided with a notch, a lever having one extremity coöperating with the notch in said feed roller, a rod pivotally connected to said lever and coöperating with the teeth of said rollers for simultaneously stopping the same, and electro-responsive means for moving said lever.

2. In a station indicator for vehicles, a pair of toothed rollers, indicating means passing around said rollers, a feed roller coöperating with said indicating means and provided with a notch, a lever having one extremity coöperating with the notch in said feed roller, a rod pivotally connected to said lever and coöperating with the teeth of said rollers for simultaneously stopping the same, electro-responsive means for moving said lever, and a circuit for said electro-responsive means.

3. A station indicator comprising a pair of toothed rollers, indicating means passing therearound, a rod having its extremities normally engaging the teeth of the rollers and slidably mounted upon the axle of one of the rollers, and electro-responsive means for reciprocating said rod.

In testimony whereof I affix my signature in presence of two witnesses.

WILLIAM Z. MUSGRAVE.

Witnesses:
RICHARD I. NEELY, Sr.,
JOHN D. JOYCE.

Copies of this patent may be obtained for five cents each, by addressing the "Commissioner of Patents, Washington, D. C."